March 3, 1931.  W. G. LAIRD  1,794,383
APPARATUS FOR STORING FLUIDS
Filed Nov. 17, 1923  3 Sheets-Sheet 1
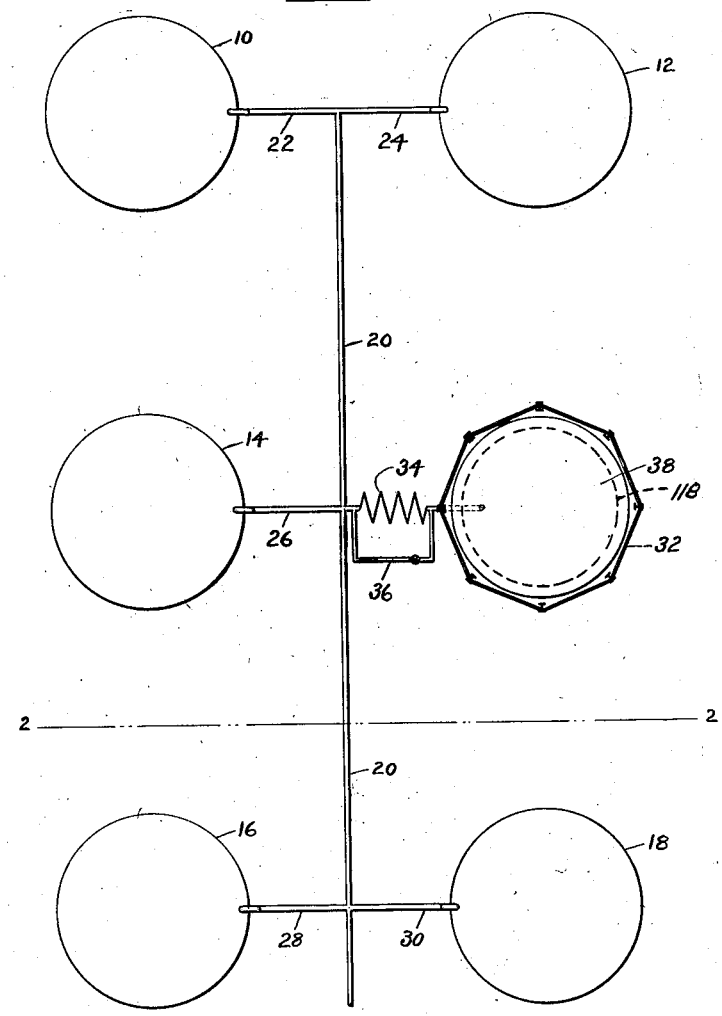
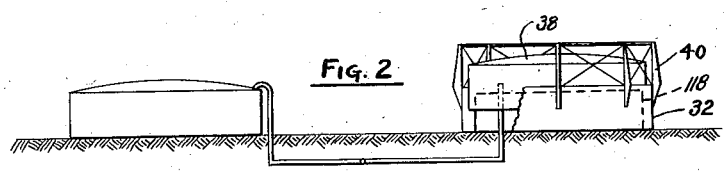
WILBUR G. LAIRD  Inventor March 3, 1931.    W. G. LAIRD    1,794,383
APPARATUS FOR STORING FLUIDS
Filed Nov. 17, 1923    3 Sheets-Sheet 2
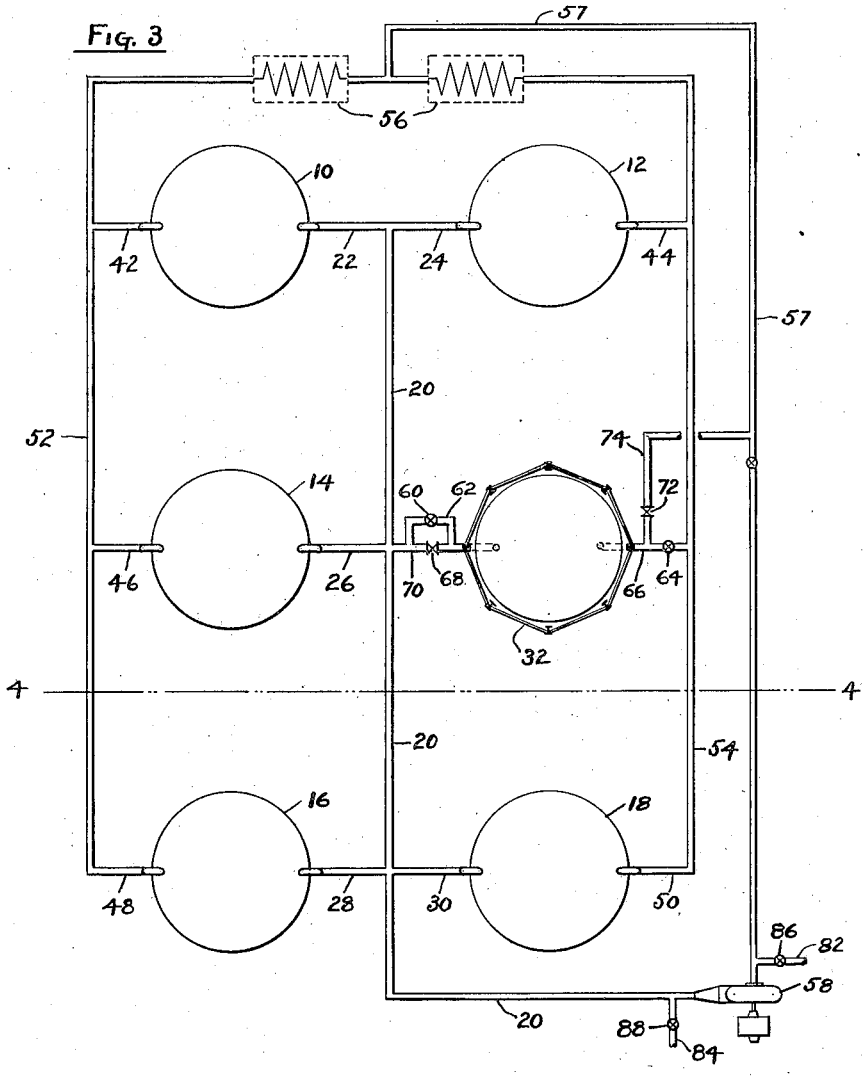
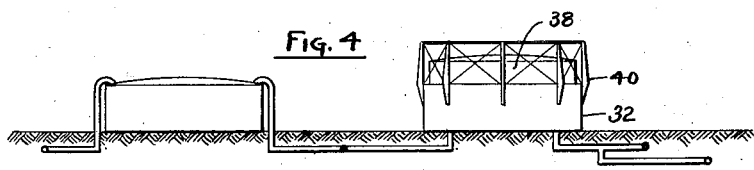
Wilbur G. Laird - Inventor
By his Attorney

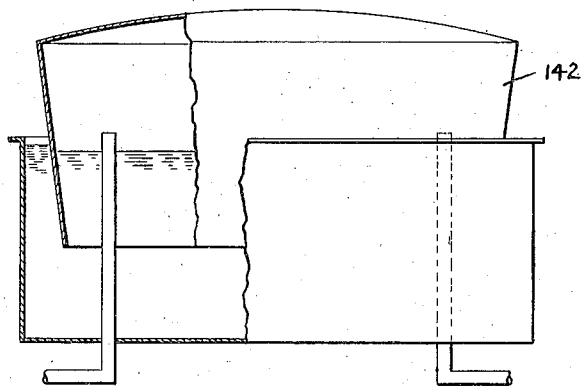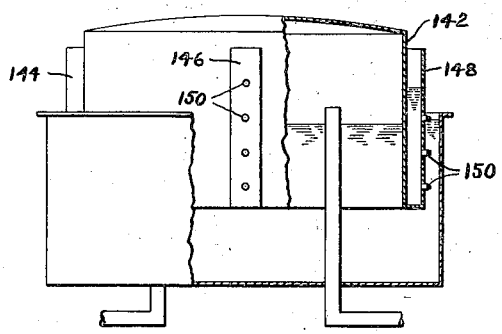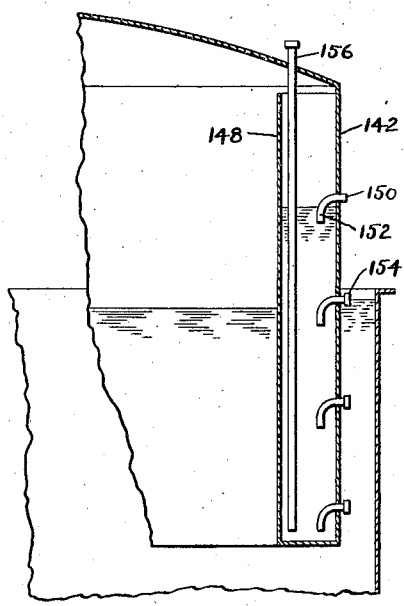

Patented Mar. 3, 1931

1,794,383

UNITED STATES PATENT OFFICE

WILBUR G. LAIRD, OF NEW YORK, N. Y., ASSIGNOR TO DOHERTY RESEARCH COMPANY, OF NEW YORK, N. Y., A CORPORATION OF DELAWARE

APPARATUS FOR STORING FLUIDS

Application filed November 17, 1923. Serial No. 675,287.

This invention relates to an apparatus for storing fluids and, more particularly, to methods and apparatus for the storage of gases and of liquids of an inflammable or volatile nature. It also relates to methods and apparatus for storing petroleum and for the treatment of the petroleum during storage.

The storage of petroleum and its more volatile products in such a way as to protect them against loss through evaporation and against danger of fires involves a number of difficulties. As the temperature of the petroleum rises, it tends to give off dissolved gases and vapors and, if the liquid is in contact with the atmosphere, the loss is increased by the greater tendency for the evolved gases to permeate this atmosphere until saturated. Owing to the very great size of the tanks required for the economical storage of the oil and to the pressure that would be generated on a hot day by this evolution of gases and vapors, it would be impracticable or impossible to construct closed tanks of sufficient size and strength to confine the petroleum and its products under the pressure of their own vapors. Even the most efficient storage methods therefore merely cover the tanks, in which the liquid is stored, with a roof of sufficient tightness to hold the vapors under slight pressure and prevent the free circulation of air thereinto, but which is provided with vents that enable air to be drawn in when the pressure in the tank drops below a definite limit and permits this air, together with whatever vapors it has picked up, to be expelled when the pressure rises to a fixed limit, slightly above that of the outside atmosphere. Accordingly, when the vapor space in the interior of the tank is cooled, as at night or in a rain storm, air is drawn into the storage tank, becomes carburetted by contact with the stored liquid, and upon the reheating of the vapor by the sun's rays, this pressure in the tank is increased and the air and vapors are expelled, the cycle being repeated to a greater or less extent with each change in atmospheric conditions.

These disadvantages are overcome by my present invention an object of which is to provide an apparatus for storing liquids of this type by which they are protected from contact with circulating or changing bodies of air or gases and are in contact with bodies of their own vapors or gases.

Another object of the invention is to provide an apparatus by which vapors and gases from a number of closed tanks may be permitted to breathe into and from a closed system without exposure to the outside atmosphere.

In this breathing of the vapors some of the lighter vapors from the crude petroleum are driven from the liquid in the outward breaths and returned with the inspirations. In the case of crude petroleum, these lighter vapors are those most sought after in the refining processes to which the petroleum is to be later subjected, and, if recovered would form a valuable product. Accordingly, another object of my invention is to provide an apparatus by which these volatile products may be isolated and removed from the gases and vapors later drawn into the tanks when breathing in.

As the number of tanks that may be cared for by a single holder is limited, it is desirable to have all of the tanks and holders under a common system, another object of the invention is to provide apparatus by means of which the various holders may be automatically maintained in balance when interconnected.

With these and other objects in view, the invention comprises the methods and apparatus described and set forth in the following specification and claims.

The various features of the invention are illustrated in the accompanying drawings, in which:

Fig. 1 is a plan view of a storage system embodying a form of my invention, details of construction, such as line drips, condenser draw-offs and similar details being omitted in this and subsequent figures for the sake of clearness, Fig. 2 is a vertical section of the storage system shown in Fig. 1, taken on line 2—2 of Fig. 1, Fig. 3 is a plan view of a modified form of storage apparatus, Fig. 4 is a plan view of the storage apparatus of Fig. 3 taken on line 4—4 of Fig. 3, Fig. 5 is a sectional view of a self balancing gas holder, the side walls being shown with exaggerated slopes, Fig. 6 is a side view, partly in section of a gas holder having weighting devices for providing a self balancing of the holders when a number are interconnected, Fig. 7 is a detail sectional view of a balancing bucket forming part of the holder of Fig. 10.

In my present invention the oil or other liquid is stored in a closed storage tank and the atmosphere of gases above the stored liquid communicates with a gas holder adapted to hold a variable volume of gas under a substantially uniform, low pressure. The tanks are adapted to hold the gases and vapors evolved from the stored liquid under a pressure slightly greater than that of the gas holder without leakage or substantial distortion and, accordingly, when additional vapors are generated or the pressure is increased by the action of heat until the pressure is greater than the back pressure from the gas holder, the gas flows to the holder, the capacity of which expands under substantially constant pressure, so that no gases or vapors escape from the system. When the pressure in the storage tanks falls, due to a drop in temperature or in barometric pressure, and consequent tendency for the gases and vapors to contract and condense, the excess gases flow back from the holder, the holder being under sufficient pressure to cause the backward flow of the gas before it drops below atmospheric pressure and without drawing in any air from the outside atmosphere. The gas holder has a bell that is sealed in water and forms a closed system that avoids all contact between the outside atmosphere and the oil and vapor storage system.

When the gases are breathed out from the tanks, they are saturated with volatile vapors from the stored liquid, the volatile vapors corresponding to the vapors of gasoline, naphtha, and other light petroleum products. If desired, the condensible vapors may be abstracted from the system before the gases return to the storage tanks, by condensation or other suitable means, only the comparatively dry gases and uncondensible vapors being returned to be again saturated and expelled into the closed system. In this way, a preliminary removal or topping of the petroleum may be obtained without the use additional refining equipment and using the sun as the source of heat. If desired means may be employed for accelerating the absorption of solar heat for this topping operation.

The number of tanks that can be served by a single holder is limited, depending on the sizes of the tanks and of the holder, the changes in temperature to which the system is subjected and similar conditions. When a very large number of tanks are located in a group requiring a number of holders, it is desirable to interconnect the holders and tanks so as to provide greater flexibility in the operation of the holders. For this purpose, it is desirable to have the holder so arranged that they rise and fall uniformly, that is, that one is not lifted to its upper limit and opportunity for the escape of gases afforded while the other holders are only partially filled. This is provided for in the present invention by providing the holder bells with weighting devices or drag buckets, or by varying the cross sectional area of the bells at different levels, so that a continuously increasing, gradual pressure is developed as the bell is lifted. Accordingly, if one bell is lifted to a height above that of the others, the increased pressure tends to force the gas to the other holders until they are brought to substantially the same level.

Referring more particularly to the accompanying drawings, in Figs. 1 and 2, petroleum or other liquid to be stored, is placed in storage tanks 10, 12, 14, 16, and 18, tightly closed against the entrance or escape of vapors or gases. The vapor spaces of the tanks connect with a main 20 by means of branch pipes 22, 24, 26, 28, and 30, respectively, and through the branch main 20 with a gas holder 32. Free communication is provided between the main 20 and the gas holder 32 so that vapors may flow back and forth under the slightest difference in pressure. This communication may take place either through a condenser 34 inserted between the holder 32 and the main 20 or through a condenser by-pass pipe 36 either of which is always open to permit the backward and forward flow of gases and vapors as the tanks 10—18 alternately cool and heat up, with the variations in atmospheric conditions.

Development of a partial vacuum or pressure below atmospheric in any of the tanks 10—18 is to be avoided, as it is very difficult, and practically impossible in the case of large storage tanks, to build tanks that will resist collapsing under an excess of external pressure, even though very slight, over the extensive areas of the tanks. The gas holder 32 is therefore arranged to maintain a sufficient pressure above atmospheric to force gas back to the storage tanks sufficiently rapid to prevent the pressures from falling below atmospheric even with the most rapid cooling. For this purpose, the holder may be adapted to maintain a pressure of three or four inches of water, for example, within the holder. The tanks 10—18 are also built vapor tight and capable of withstanding a pressure sufficiently above that of the gas holder to force gas to the holder under all conditions, without distortion or leaking. For this purpose, the tanks are preferably provided with a roof having the form of a portion of a sphere, similar to those of gas holders so that it will tend to stay in shape under pressure.

The gas holder 32 is provided with a water sealed bell 38 which rises and falls to maintain a substantially constant pressure as gas flows into and out of the holder, and is provided with guide frames 40 of the usual or any suitable type. The water sealing of the system prevents any contact of the atmosphere with the stored liquids or vapors and thus prevents any escape of the stored liquid into the atmosphere as long as the system remains unbroken.

When crude petroleum is stored, the vapors which are evolved into the gases circulating through the system contain those constituents that make up a large and most valuable part of gasoline. When desired, the condensible portion of these vapors may be recovered by passing the gases and vapors through the condenser 34 as they flow back and forth between the holder 32 and the tanks 10—18. This condenser may be of any suitable type, being illustrated diagrammatically in the accompanying drawings, and is cooled by any suitable cooling means to a temperature sufficiently low to cause the condensation of vapors from the gas-vapor mixture. Accordingly, with each backward and forward flow of the gases, a part of the liquid evaporated in the tanks 10—18 by the sun's heat is recovered in the condenser 34 as a gasoline distillate. When the production of a gasoline product in this manner is not desired, however, the gases are caused to flow through the by-pass pipe 36. When the pipe 36 is used, rapid changes in the temperature of the stored liquid and gas are not necessary or desirable, but when a rapid production of gasoline in the condenser 34 is desired, any suitable means may be used for causing a more rapid absorption of the sun's heat and for increasing the number of cycles of alternate heating and cooling.

The modification of the invention illustrated in Figs. 3 and 4 is particularly adapted to encourage the recovery of gasoline through the heating effect of the sun, or by "Solar Topping." This is obtained by causing a stream of gases to circulate through the tanks, picking up light or gasoline vapors, extracting the condensible constituents from these vapors and return the denuded or dry vapors to the tanks to pick up a fresh charge of vapors. For this purpose, the wet or saturated vapors are withdrawn from the tanks 10—18 through branch pipes 42, 44, 46, 48, and 50, and mains 52 and 54, separate from the branches 22—30 and mains 20, which are used for the return of dry or denuded gases, and pass through condensers 56 cooled sufficiently to condense vapors from the gases. The gases are then drawn from the condensers through a return pipe 57 by an exhauster-blower or booster 58 and supplied to the main 20 from which they are passed to the various tanks and permitted to pick up a fresh charge of vapors and return to the condensers 56. The booster 58 does not affect materially the pressures throughout the system as a whole nor in the various tanks and gas holder but acts merely to cause such a local pressure differential as to create a circulation of the gases and vapors. Accordingly, when the system is slowly heated by atmospheric changes which create an increase in pressure, the excess gas flows freely into the gas holder and when the system is cooled again the pressure drops below that of the gas holder, the gas freely flows from the holder to the tanks, in the same manner as described in connection with the embodiment shown in Figs. 1 and 2.

When the system is in normal operation in connection with the booster 58 it is preferred to have the holder, if it contains oil storage, serve in a similar manner to the other storage tanks. To accomplish this, the valves 60, in a by-pass pipe 62 and 64 in a pipe 66 are opened so that the dry gas from pipe 20 may pass through the holder and issue as wet gas into the pipe 54 from which it flows through the condenser and to the intake side of the booster. It will be understood that during this operation, all ordinary breathing may be effected without interrupting the general direction of gaseous flow. For example, when the system is gradually cooled, as by nightfall, the volume of dry gas passing to the holder will decrease, and the volume of wet gas leaving the holder will increase. Similarly, when the system is heated, as by increased heat from the sun, the volume of dry gas passing to the holder will increase, and the volume of wet gas leaving the holder will decrease.

When it is desired to secure a solar topping effect without the aid of the booster circulation, the valves 60 and 64 are closed, and the check valves 68 in pipe 70 and 72 in by-pass pipe 74 from the holder to the pipe 57 will operate in a manner to take advantage of the atmospheric changes that cause breathing, and will effect a direction of gaseous flow that will result in solar topping. For example, as the gaseous volume in the system diminishes, the surplus gas in the holder will flow out through the check valve 68 into the pipe 20 and thence to the tanks 10, 12, 14, 16, and 18. Similarly, when the gaseous volume in the system increases, the wet gas will flow out through the pipes 42, 44, 46, 48, and 50 into their respective gathering pipes 52 and 54, and thence through the condensers to pipe 57 and into the holder through the check valve 72.

This solar topping arrangement not only serves to cut down the variation in temperature and the rapidity of temperature changes in the tanks by maintaining them at a uniformly lower temperature, but also serves to obtain a product of high quality and value from the oil without the use of fuel or of expensive distillation apparatus, and, moreover, a product which is ordinarily lost in the usual type of storage.

When, as is usual in the case of the storage of high gravity crude petroleum, the petroleum contains dissolved gases which can not be condensed and held in their condensed form during storage, there is a gradual accumulation and increase in the gas within the holder or system. This gas may be piped off at intervals, passing through a suitable absorption system for the recovery of the last traces of condensible products. At times, as for example, where oil is being removed in large quantities, it may be necessary to supply gases such as natural gas or other gas, preferably of a non-oxidizing nature, to the system. For this purpose, inlet and outlet pipes 82 and 84 are provided controlled by valves 86 and 88, respectively.

Inasmuch as the bell or lift of the gas holder successively rises and falls in the sealing liquid this liquid should not be of a volatile or inflammable nature. The usual type of gas holder, having a water seal, is entirely suitable for this purpose. However, the tank in which this sealing water is contained has a large volume within the bell which would be very desirable for the storage of petroleum or its products and which is, in the usual type of gas holder, utilized only for the holding of a quantity of water of no value or utility except for the maintaining of the water level at the sealing space around the walls of the bell or lift.

To utilize this interior space for the storage of liquids lighter than water without interfering with the water seal, the present invention provides a sealing ring of cheap and simple construction by which the interior space may be separated from the water sealing space and utilized for liquid storage. This is accomplished by enclosing the space at the interior of the tank by a ring of light weight so arranged that the liquid stored within this ring is in hydrostatic balance with the sealing liquid outside the ring, thus avoiding all tendency to collapse, or reducing such tendency to a negligible minimum. This holder construction is illustrated and described in my Patent No. 1,628,635, granted May 10, 1927.

In the oil storage system of the present invention, a number of oil storage tanks are connected to a single gas holder or movable cover storage tank, the number shown in the above embodiments being shown merely by way of example. The number of tanks which can be operated by a single holder or holder tank of the size suitable for, or selected for, this purpose is, however, limited. Where a tank farm contains more tanks than a single holder will operate, the tanks are collected in groups to different holders, which may then be interconnected so that an abnormal demand for gas or for storage space made on one holder may be taken up by the other holders. Although these holders should have substantially equal pressures at the same altitude of the lifts, it is difficult, and in some cases impossible, to obtain a perfect pressure balance between all of the holders and, accordingly, as a very small differential pressure would cause the gas to slowly flow to, and accumulate in, a single holder of the lowest pressure until the pressures were equalized, it might frequently happen that one holder would be filled to overflowing before any considerable capacity were utilized in the other holders.

The present invention therefore provides a holder so arranged that each holder is caused to create a substantial increase in back pressure before reaching the upper limit of its capacity and thus cause the other holders to receive their proportionate share of gas before any holder is overloaded. In the modification shown in Fig. 5, this is accomplished by varying the cross sectional area of the bell or lift so that the pressure is varied as the bell rises. By decreasing the diameter of the shell 142, or slanting it inwardly, as indicated in Fig. 5, the weight of the holder bell is thereby distributed over a smaller area at the water level, the pressure per square inch is increased, and the greater pressure thrown on the gas causes it to be distributed proportionately among the other holders.

In the modification shown in Figs. 6 and 7, the increase in gas pressure is obtained by weighting the holder bell as it rises out of the sealing liquid. This is obtained by mounting a series of drag buckets or liquid holding chambers 144, 146, and 148 at spaced intervals about the circumference of the holder bell. The buckets are shown as mounted on the exterior surface of the shell 142 of the gas bell in the embodiment of Fig. 6 and on the interior of the shell in the embodiment of Fig. 7. The buckets are provided with a number of holes or openings 150 at different heights, which may be plugged separately of each other. When the bell sinks into the sealing liquid, the buckets fill with water and, as the bell rises, the water flows out of the buckets until the lowest open or unplugged opening of each bucket is reached. As the bell rises further, it lifts this water remaining in the buckets and thus rapidly adds to the weight of the bell and rapidly increases the internal gaseous pressure within the bell. In the embodiment of Fig. 7, in which the buckets are mounted on the interior of the bell wall, the openings 150 are provided with small sealing tubes 152, the outer ends of which may be closed by means of individual caps 154, and a pipe 156 is provided to extend through the top of the bell for filling the buckets when they are first filled before sinking into the sealing liquid. If desired, the drag buckets may be used to exert a buoyant effect by emptying them of water and sealing them against the inflow of water, thus reducing the pressure within the bell.

In drawing off the liquid from the storage tanks, it is customary to draw from the top in order to obtain dry oil and to avoid bottom settlings, and for this purpose, a "swing pipe" is usually employed. This swing pipe may be raised and lowered without opening the tank to the atmosphere by any of the commonly used apparatus.

While the invention has been described particularly as applied to an oil storage system, it is to be understood that it may be used on active tanks such as surge tanks of pipe line systems, run down tanks, work tanks, lease tanks, and, in general, wherever it may be used to advantage in the storage of volatile fluids. It is to be understood, moreover, that when a volatile product is separated from the stored liquid under conditions in which such a separation is not desired, as, for example, in the case of petroleum in transit in pipe line systems, it may be returned to the body of the stored liquid.

As changes of construction could be made within the scope of my invention, it is desired that all matter contained in the above description or shown in the accompanying drawings shall be interpreted as illustrative and not in a limiting sense.

Having described the invention, what I claim and desire to secure by Letters Patent is:—

1. In apparatus for storing and conserving mineral oils, the combination of a plurality of sealed oil storage tanks, a variable volume gas holder equipped with a water sealed bell and having gas storage capacity substantially equal to the capacity of at least one of said storage tanks, and a breather line forming a closed connection between the gas spaces at the top of each of said storage tanks and the holder bell and affording free passage for gas between said gas holder and said storage tank as the pressure in said storage tanks tends to vary from that in the gas holder.

2. Apparatus for storing and conserving petroleum oil comprising, in combination, a plurality of sealed oil storage tanks, a variable volume gas holder having an inner oil ring forming an inner oil storage compartment and an outer water sealing compartment in hydrostatic equilibrium therein, a gas bell top for said holder of gas storage capacity substantially equal to the capacity to one of said tanks, said bell being sealed in said water compartment, and a breather line connecting the interior of said bell with the gas space at the top of each of said storage tanks whereby free passage of gas back and forth between said storage tanks and said bell takes place as the pressure in any of said storage tanks tends to change from the substantially constant pressure maintained by said bell.

3. Apparatus of the type described which comprises, groups of gas tight storage tanks, a water sealed gas holder for each group of tanks, means connecting the gas spaces of said storage tanks to said gas holder to permit the free passage of gas between said gas holder and the storage tanks of their respective groups, means connecting said holders to each other, and means for rapidly increasing the gaseous pressures in said holders as they reach a limiting height.

4. Apparatus of the type described which comprises, groups of gas tight liquid storage tanks, a water sealed gas holder for each group of tanks, means connecting the gas holders to the tanks to permit the free passage of gas between the holders and the storage tanks of their respective groups, means for connecting said holders to each other and spaced buckets on the bells of said holders for picking up increasing quantities of water as the bells rise past a definite limit.

5. Apparatus for storing and conserving petroleum oils comprising, in combination, a gas-tight oil storage tank, a variable volume gas holder having a water sealed bell for storing gas of capacity substantially equal to that of said tank, a closed pipe connection for conducting gas from said tank into said bell, and separate means, forming with said pipe connection a closed circuit, whereby gas is conducted from said holder bell back to said tank to maintain a substantially constant pressure therein.

6. In apparatus for storing and conserving petroleum oil, in combination, a plurality of sealed oil storage tanks, a variable volume sealed gas holder of large storage capacity, a breather line connecting said holder with the top of each of said tanks, said holder being operable through said breather line to maintain a substantially constant gas pressure in each of said tanks, and a condenser and connections interposed in said breather line whereby gasoline vapors passing through said line may be liquefied and removed from the closed system formed by said holder, tanks and breather line.

7. Means for conserving vapors evolved from volatile liquid stored in a plurality of sealed liquid storage tanks comprising a liquid seal compartment in one of said tanks, a gas bell of variable gas storage volume sealed in said liquid seal compartment, and a vapor breather line connecting the interior of said bell and the top of each of said storage tanks, said bell being thereby rendered operable to maintain substantially constant pressure in each of said tanks while permitting breathing of said tanks due to changes in temperature and changes in volume of liquid stored therein.

8. Apparatus for storing and conserving oil vapors evolved from oil stored in a plurality of sealed oil storage tanks comprising, a vapor breathing line connecting the tops of each of said tanks, and a variable volume liquid sealed gas storage holder forming with said line and tanks a closed system, said holder being operable to maintain each of said tanks under substantially constant pressure to thereby prevent collapse of said tanks due to temperature changes or changes in volume of oil stored therein.

9. Apparatus for storing and conserving petroleum oil comprising, a sealed tank for storing oil containing volatile constituents and having an oil storage space and a vapor space, a gas storage member being constructed to provide a variable volume for the storage of gas, a closed conduit between the vapor space of the said tank and the gas storage member, and means combined with said conduit whereby vapors of normally liquid constituents are removed from gas flowing between said tank and said storage member.

In testimony whereof, I affix my signature.

WILBUR G. LAIRD.